United States Patent [19]
Cunningham

[11] Patent Number: 6,023,389
[45] Date of Patent: Feb. 8, 2000

[54] METHOD AND APPARATUS FOR WRITING SERVO BURSTS WITH COMPENSATION FOR ERASE BANDS IN A DIRECT ACCESS STORAGE DEVICE

[75] Inventor: Earl A. Cunningham, Rochester, Minn.

[73] Assignee: International Business Machines Corporation, Armonk, N.Y.

[21] Appl. No.: 08/878,316

[22] Filed: Jun. 18, 1997

[51] Int. Cl.[7] .................................................. G11B 21/10
[52] U.S. Cl. ................................. 360/75; 360/57
[58] Field of Search .................................. 360/75, 77.02, 360/77.03, 77.05, 77.08, 78.04, 78.14, 57

[56] References Cited

U.S. PATENT DOCUMENTS

| | | | |
|---|---|---|---|
| 4,396,960 | 8/1983 | Matla et al. | 360/77.02 |
| 4,530,019 | 7/1985 | Penniman . | |
| 5,229,895 | 7/1993 | Schwarz et al. . | |
| 5,241,435 | 8/1993 | Saito et al. | 360/75 X |
| 5,307,218 | 4/1994 | Kitamura et al. . | |
| 5,381,281 | 1/1995 | Shrinkle et al. | 360/77.08 |
| 5,757,574 | 5/1998 | Chainer et al. | 360/75 |
| 5,867,337 | 2/1999 | Shimomura | 360/75 |

FOREIGN PATENT DOCUMENTS 4-102278  4/1992  Japan .

OTHER PUBLICATIONS

U.S. Patent application ser. No.156,531 filed Nov. 23, 1993, entitled Asynchronous Digital PES Demodulation Disk Drive Servo Control System by Wayne Cheung et al.

*Primary Examiner*—Aristotelis M. Psitos
*Assistant Examiner*—James L. Habermehl
*Attorney, Agent, or Firm*—Joan Pennington; Matthew J. Bussan

[57] ABSTRACT

A method and apparatus are provided for writing servo bursts with compensation for erase bands in a direct access storage device (DASD). A first servo burst is written on the magnetic disk media using a transducer head in the DASD. The transducer head is moved in a first direction and the first written servo burst is trimmed. The transducer head is moved in a second direction opposite the first direction corresponding to the width of an erase band and then a next servo burst is written.

8 Claims, 17 Drawing Sheets

PRIOR ART    FIG. 4

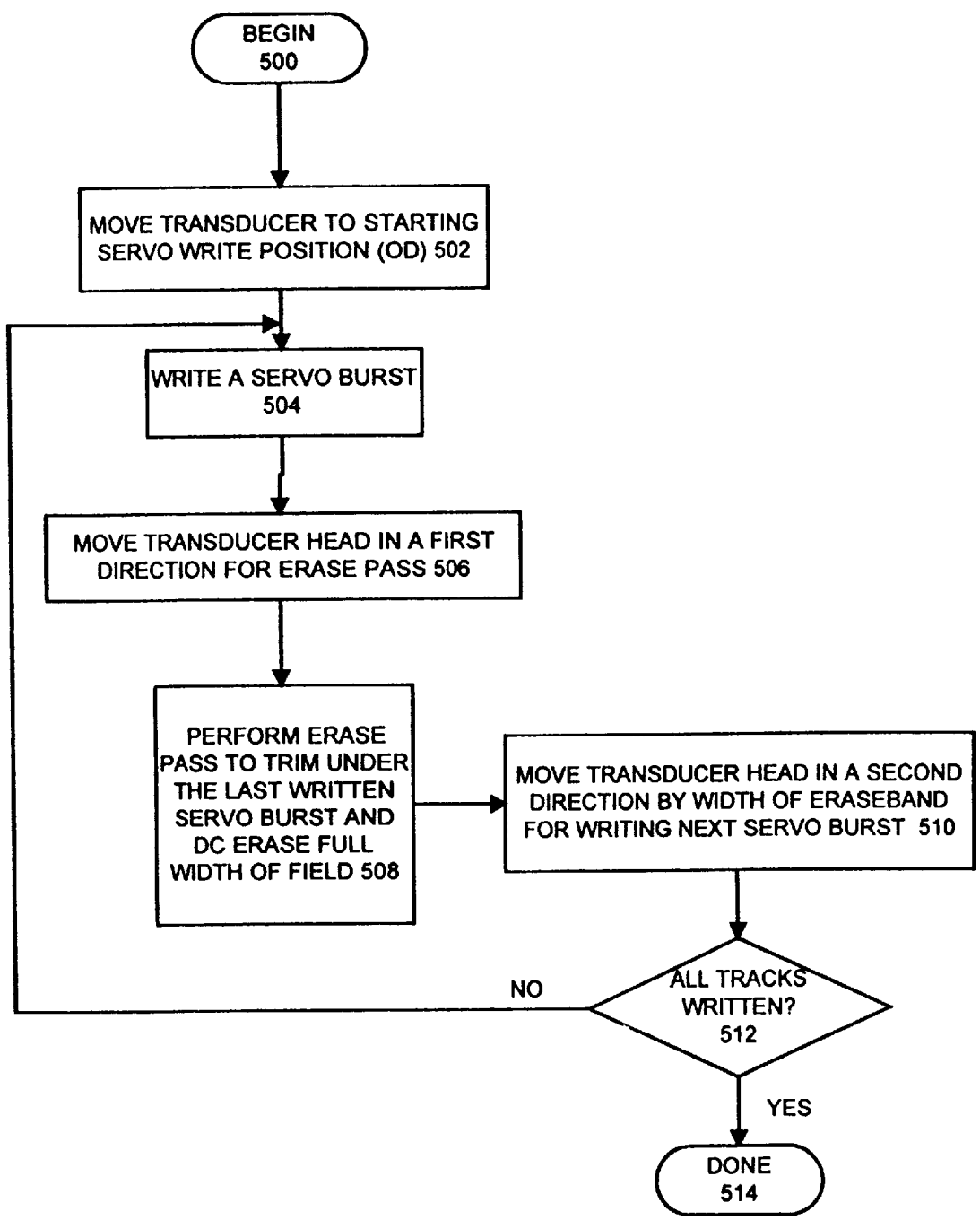

METHOD AND APPARATUS FOR WRITING SERVO BURSTS WITH COMPENSATION FOR ERASE BANDS IN A DIRECT ACCESS STORAGE DEVICE

FIELD OF THE INVENTION

The present invention relates methods and apparatus for writing servo patterns, and more particularly to, a servo writing method and apparatus for writing servo bursts with compensation for erase bands in a direct access storage device (DASD).

DESCRIPTION OF THE RELATED ART

Disk drive units often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

In direct access storage devices (DASDs), it is necessary to position the transducer heads over data tracks on the disk surfaces to properly record and retrieve data. It is necessary to measure the radial and circumferential position of the transducer heads flying above the disk surfaces. Radial position information is used to locate and maintain the head over circular tracks on the disk surface. Circumferential position information is used to identify the start of different information fields around the track circumference. The accuracy and reliability of head position measurements is very important, since poor tolerance in these measurements will degrade the performance and storage capacity of the DASD. Typically this is accomplished by providing servo information on one or more disk surfaces for reading by the transducer heads.

Classic servo patterns have been written at lower density than data. This is partly to reduce the width of erase bands between patterns written at adjacent positions, and partly to have wavelengths long enough to have the jitter of the servo writers be a small enough fraction, so that the adjacent patterns are phase aligned well enough for adjacent patterns to be read at one head position over both patterns, and the peaks of each pattern will be sufficiently close to appear as single pulses.

The resulting low density patterns result in low amplitude as compared with data, making detection more difficult without significant redundancy and averaging. The long wavelengths cause the servo patterns to be longer, and the extra redundancy and averaging adds to the length even more. The lower frequencies also typically required a separate lower frequency channel to handle the processing, and require duplication of several parts of the electronic channel.

When the erase bands were small, at low servo density, one technique used in some cases to compensate for erase bands was to reduce the write current. This reduced the distance that the outer edge of the erase band occurred, and thus could reduce the erase band to nearly zero, with moderate reductions of the write current.

There are two things wrong with this approach for present use. First typically the servo patterns are presently written with the data transducer heads in the disk drive instead of a separate servo-writer head. This means that every arm electronics (AE) module in every drive must have the capability to reduce the write current. This typically requires another control line and either more internal or external parts, which translates to more cost and reduced reliability.

The second, and more severe difficulty, is that with much larger erase bands, the current would have to be very significantly reduced, such as likely ⅓ of the normal current. This reduces the normal overwrite capability and can cause more difficulty in writing servo patterns, which includes overlaying part of another track, which means that the overwrite must be of some reasonable capability.

One known servo system writes quad burst patterns with each servo burst one full data track pitch wide. There are four of these bursts offset in time (distance circumferentially), and offset radially by one half of a track pitch. The pattern repeats every two customer or data tracks. This was simple when the write elements of servo-writer heads were over one customer track wide. However, writing servo patterns with the data heads which are less than a full track pitch wide, meant that the burst had to be pieced together by writing two or more parts next to each other that were of the same phase. This was still fairly simple at low densities, but becomes much more difficult at higher densities.

A significant problem results when servo bursts are written at high density, then similar to the data, the erase bands are significantly larger than they previously were, and are now the same size as for data, which can be up to 25% of the track pitch. In data, these are desirable as buffer zones between data tracks, but in classic servo, the erase bands eliminate significant area expected to be magnetized with the specific servo pattern.

SUMMARY OF THE INVENTION

A principal object of the present invention is to provide an improved method and apparatus for writing servo bursts with compensation for erase bands in a direct access storage device (DASD). Other important objects of the present invention are to provide such method and apparatus substantially without negative effects; and to provide such method and apparatus that overcome many of the disadvantages of prior art arrangements.

In brief, a method and apparatus are provided for writing servo bursts with compensation for erase bands in a direct access storage device (DASD). A servo burst is written on the magnetic disk media using a transducer head in the DASD. The transducer head is moved in a first direction and the written servo burst is trimmed. The transducer head is moved in a second direction opposite the first direction corresponding to the width of an erase band and then a next servo burst is written.

BRIEF DESCRIPTION OF THE DRAWINGS

The present invention together with the above and other objects and advantages may best be understood from the following detailed description of the preferred embodiments of the invention illustrated in the drawings, wherein:

FIG. 5A is a logical flow diagram illustrating servo writing steps for the data storage disk file of FIG. 1 in accordance with the present invention;

DETAILED DESCRIPTION OF THE PREFERRED EMBODIMENTS

Figure 1:
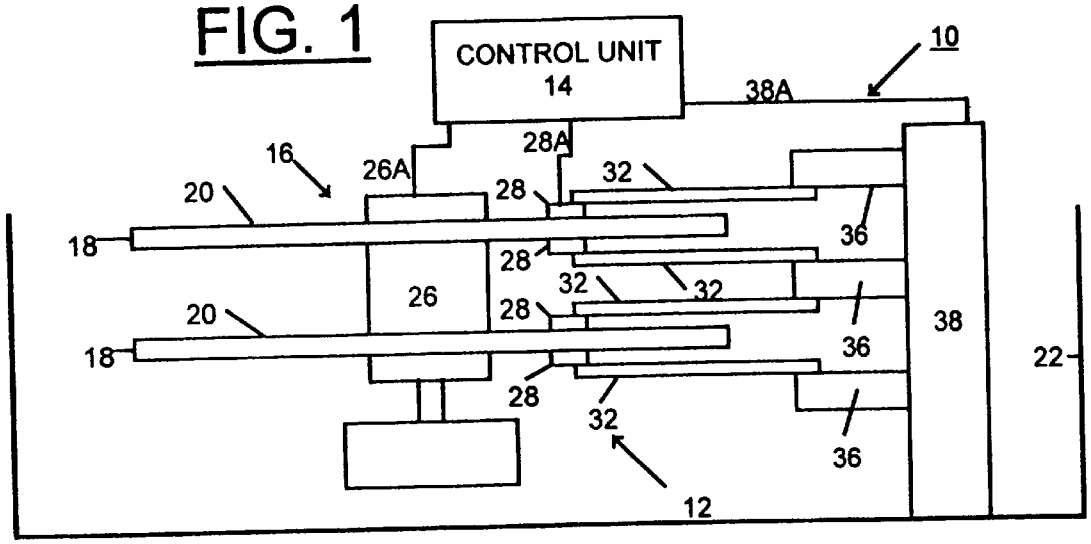
FIG. 1 is a schematic representation of a data storage disk file in accordance with the present invention.
Figure 2:
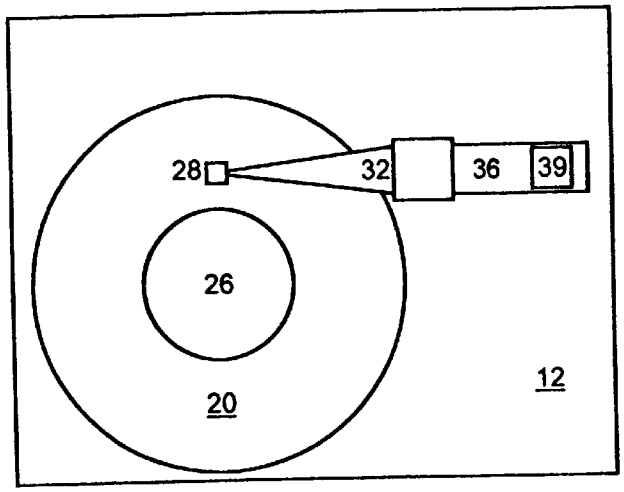
FIG. 2 is a block diagram illustrating the data storage disk file of FIG. 1 in accordance with the present invention.

Having reference now to the drawings, in FIGS. 1 and 2 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is carried by a suspension 32. The suspensions 32 carried by arms 36 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read. The disk drive unit 12 is controlled in operation by signals provided by the control unit 14, including motor control signals on line 26A and head position control signals on line 38A.

Figure 2A:
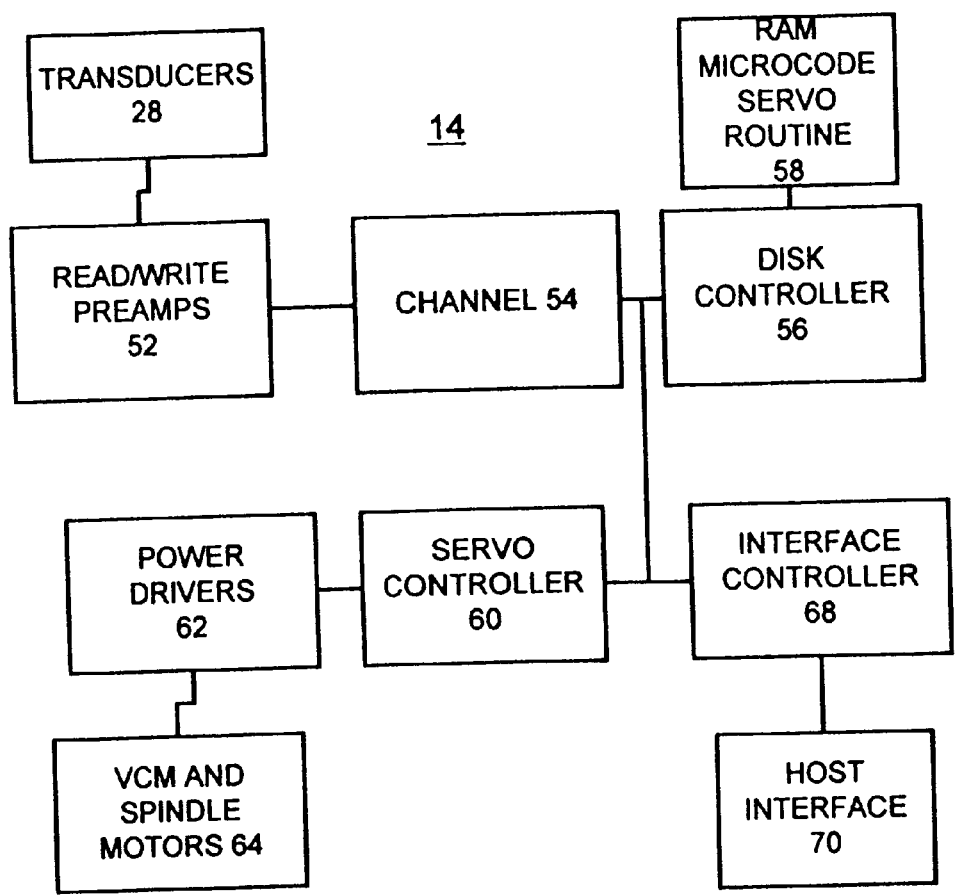
FIG. 2A is a block diagram illustrating a control unit of the data storage disk file of FIG. 1 in accordance with the present invention.

Referring to FIG. 2A, there is shown a block diagram functional representation of the disk file control unit 14 for carrying out the servo writing methods of the invention. Servo information and customer data are read by the R/W transducers 28 and amplified by read/write preamplifiers (preamps) 52. A data channel 54 uses known sampling techniques for detecting the readback signals from the disk 20 that contain the customer and servo data. An embedded disk controller 56 coupled to a random access memory (RAM) 58 is coupled to the data channel 54 and a servo controller 60. The servo controller 60 performs servo control functions providing servo positioning control signals to a power drivers block 62 coupled to the VCM and spindle motors 64. An interface controller 68 coupled to the embedded disk controller 56 performs interface processor functions. A host interface 70 is coupled to the disk controller 56 via the interface controller 68.

Control unit 14 provides an interface via the host interface 70 with a computer (not shown) that provides data read and write commands, and data signals are transmitted to or from the transducer head assemblies over corresponding lines 28A, one of which is seen in FIG. 1. The transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20. An initial servo pattern is provided on one or more disk surfaces 20 by a conventional servo writer (not shown). Servo position information is written or recorded on the disk surfaces 20 using the transducer head assemblies 28 operatively controlled by the RAM stored microcode servo routine as illustrated and described with respect to FIGS. 5 and 5A, using the initial servo pattern from one disk surface 20.

In accordance with features of the invention, servo bursts are written in the disk file 10 with compensation for erase bands with the servo system arranged to run at the high frequencies of the data channel 54. In brief, servo bursts are trimmed from a first recorded width down to a specific width, by moving the transducer head 28 away an additional amount equal to an erase band width in addition to the desired width for the servo burst pattern. One obvious restriction is that the resulting width must be less than or equal to the natural width written by the recording head.

Figure 3:
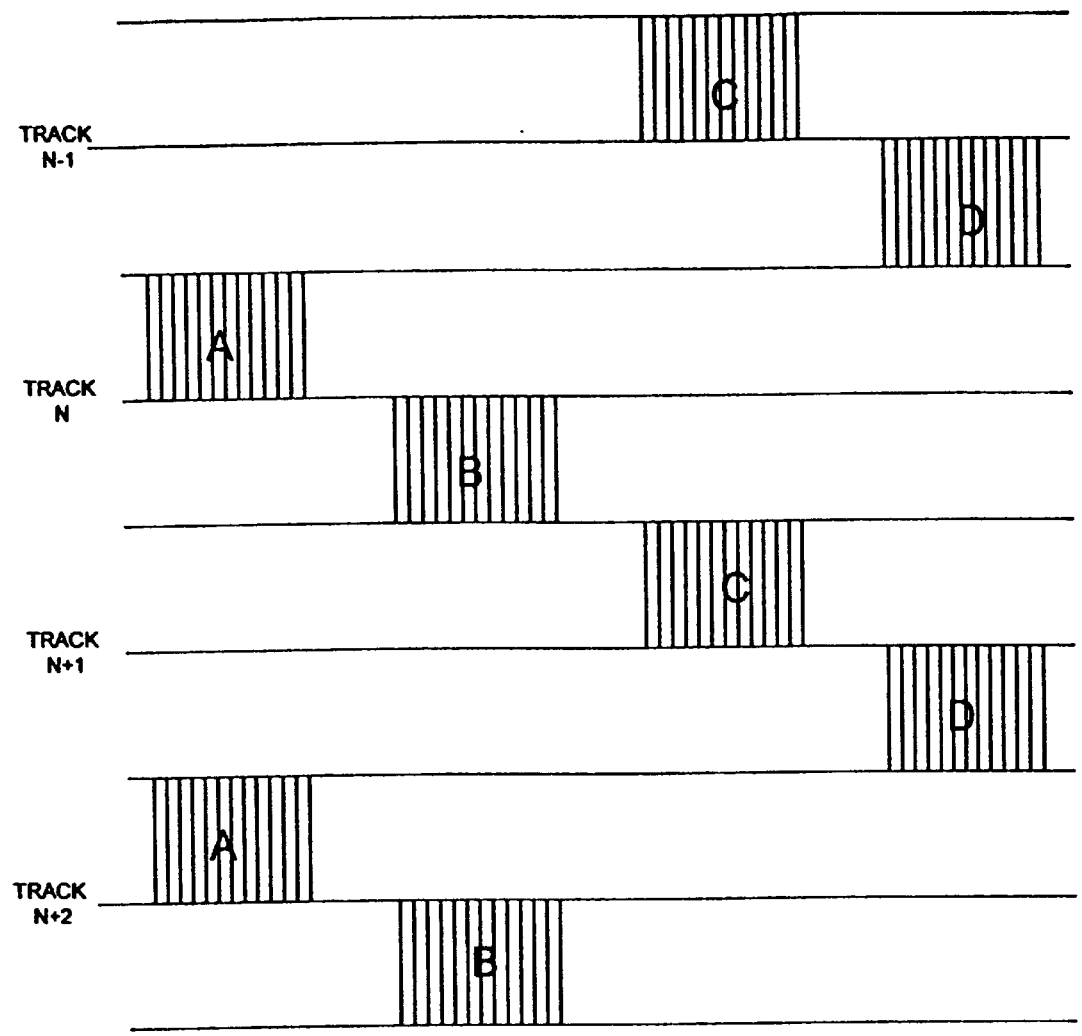
FIG. 3 is a chart illustrating servo bursts shown idealistically neglecting the effect of erase bands.
Figure 4:
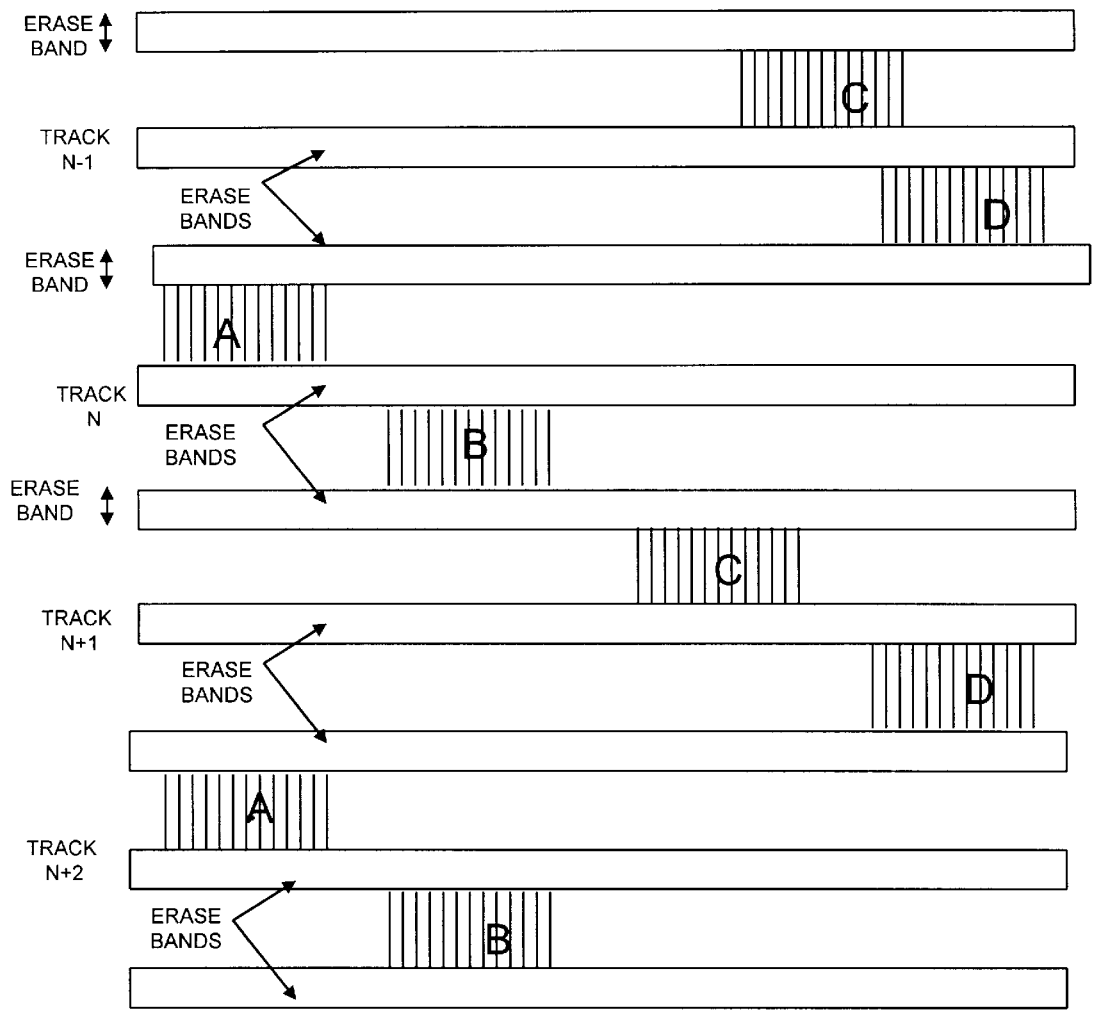
FIG. 4 is a chart illustrating servo bursts with conventional trim.
Figure 5:
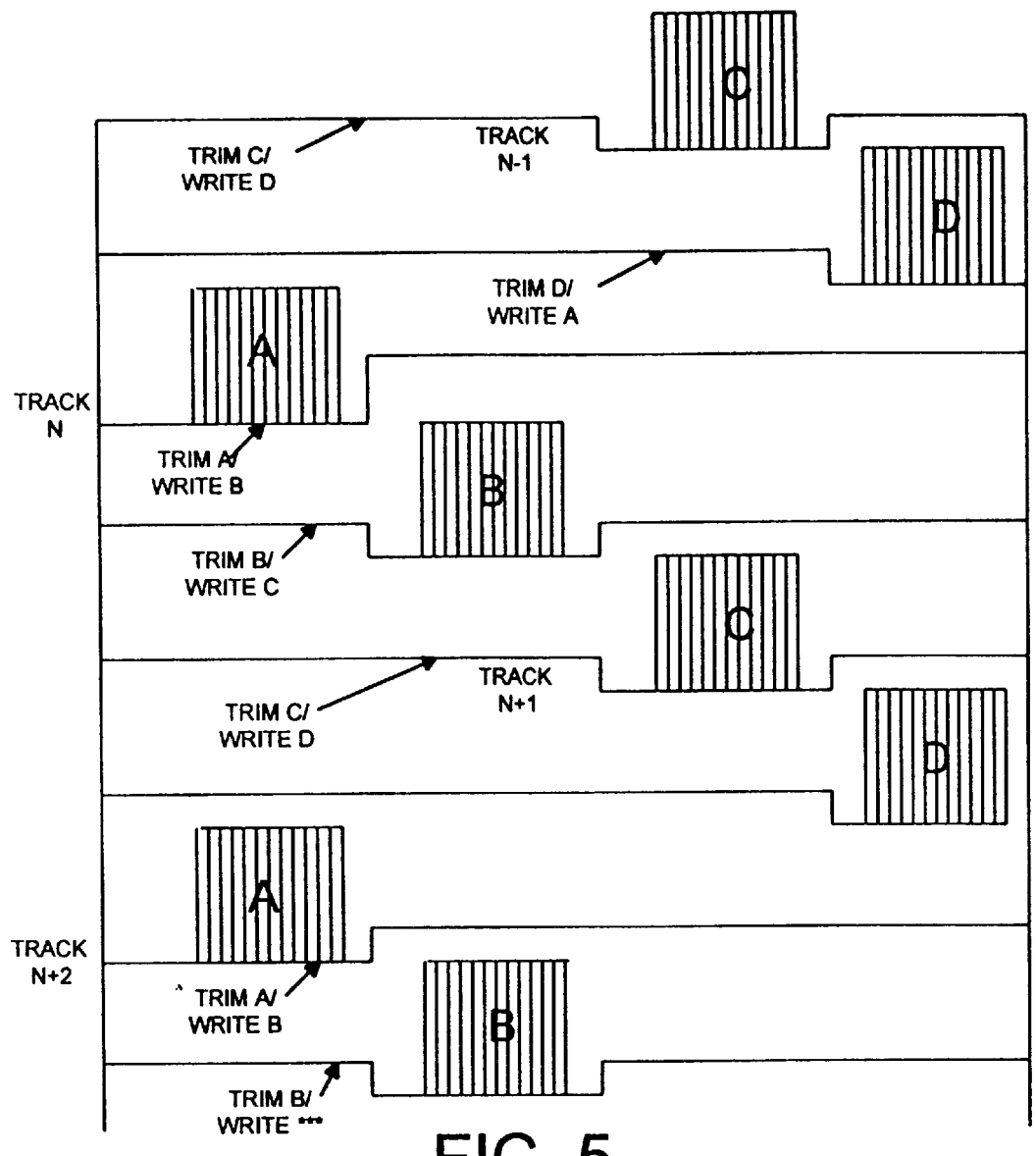
FIG. 5 is a chart illustrating servo bursts with trim arranged in accordance with the present invention in the data storage disk file of FIG. 1.

Referring now to FIGS. 3, 4, 5, and 5B–5H there are shown servo bursts labeled A, B, C, and D that are half a track wide, and are offset in time. The transitions of each burst are indicated by vertical lines. The white space between bursts is the DC erased area. FIG. 3 illustrates the quad burst servo pattern idealistically, neglecting the effect of erase bands. FIG. 4 illustrates servo bursts with conventional trim. FIG. 5 illustrates servo bursts with trim arranged in accordance with the present invention. FIGS. 5B–5H illustrate sequential steps for writing and trimming servo bursts with servo burst trim arranged in accordance with the present invention as shown in FIG. 5.

FIG. 4 shows how the servo pattern conventionally would be recorded using a standard trim and having an erase band between adjacent servo bursts, for example, of about 20% of the pitch. The servo bursts are written from OD to ID with increasing track numbers, or from top to bottom on the page. The top edge (OD side) is the natural edge formed at the edge of the transducer head 28. Since the width of the written magnetization of a recording head 28 is over a half track wide, the original lower edge of Burst A extends below the desired lower edge of Burst A. With a known servo writing method, the transducer head 28 is moved a half track offset (down) and the lower burst edge is trimmed off by the transducer head 28 passing past Burst A while DC erasing before writing Burst B. The polarities are reversed multiple times in the writing of Burst B. In the next step, the head will trim off Burst B on the lower edge, while erasing just before the write of Burst C. These sequential steps are repeated until the inside diameter (ID) is reached and all the available tracks have been written. It should be understood that the sequential servo pattern writing steps can be started at the inside diameter (ID) and be repeated until the outside diameter (OD) is reached.

As shown in FIG. 5, a quad burst pattern is shown with the upper edges of the erase bands indicated by the lines labeled TRIM C/WRITE D, TRIM D/WRITE A, TRIM A/WRITE B, TRIM B/WRITE C, TRIM C/WRITE D, TRIM A/WRITE B, and TRIM B/WRITE ***. These erase band edges result from the preferred servo writing method with erase band compensation of the invention. The preferred servo pattern shown in FIG. 5 results from moving the transducer head assembly 28 for a separate erase pass provided to trim Burst A, and then the recording head is moved back toward Burst A by the width of the erase band to write Burst B. FIG. 5 shows how the quad bursts are written in accordance with the servo writing method of the invention. First the lower edge of a last written burst is trimmed on a separate erase pass after moving the transducer head 28 a distance equal to the sum of the erase band width and the desired width of the servo burst, and turning the erase on below the last written burst. The transducer head 28 must then be moved back by the width of the erase band, to write the next burst. Then the next burst is trimmed by erase from the left side, across and under the burst, erasing any old magnetization left from any tests or other servo writing, as with reworked disks. The transducer head 28 must then be moved back by the width of the erase band, to write the next burst. The resulting servo pattern of FIG. 5 provides better PES accuracy, but at the expense of extra servo writing time as compared to the conventional technique of FIG. 4. The penalty for getting the magnetic widths at the correct size, is the extra passes that are required to trim the servo bursts at the correct place. This is comparable to the number of passes required for some known servo arrangements that are written at quarter track increments. It should be understood that significant benefits can be achieved by writing at the higher frequencies.

Referring to FIG. 5A, there is shown a flow diagram illustrating servo writing steps of the preferred embodiment starting at a block 500. First the transducer head assembly 28 is moved to a starting position, such as the outer diameter (OD) of a disk surface 20 as indicated at a block 502. A first servo burst (burst A) is written as indicated at a block 504. Then the transducer head assembly 28 is moved in a first direction to trim the first servo burst A as indicated at a block 506. The transducer head assembly 28 is moved in the first direction a distance equal to a desired distance corresponding to the desired width of the servo burst together with an additional distance corresponding to the width of the erase band to obtain the correct position for an erase pass. Then an erase pass is performed to trim under the last written servo burst and DC erase the full width of the field as indicated at a block 508. The transducer head assembly 28 is moved in an opposite or second direction a distance equal to the erase band for writing a next servo burst as indicated at a block 510. Then the sequential steps are repeated returning to block 510 where a next servo burst is written, until all tracks have been written when the inside diameter (ID) is reached as identified at a decision block 512. This completes the servo writing steps as indicated at a block 514.

Figure 5B:
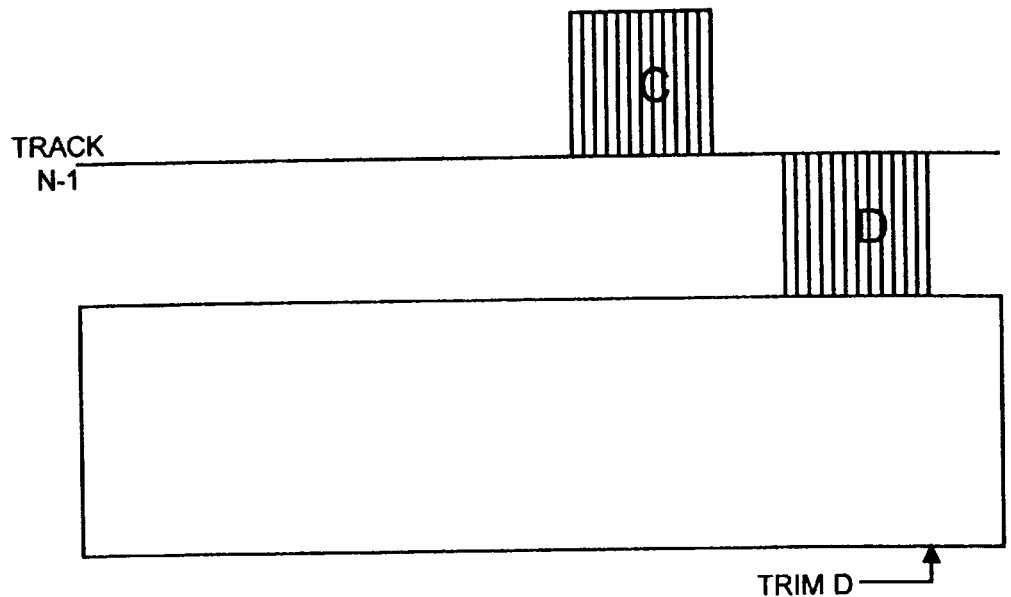
FIGS. 5B–5H are charts illustrating sequential steps for writing and trimming servo bursts with servo burst trim arranged in accordance with the present invention in the data storage disk file of FIG. 1.

Referring now to FIGS. 5B–5H, sequential steps for writing and trimming servo bursts are shown in accordance with the present invention, as illustrated and described above with respect to FIGS. 5 and 5A. Referring first to FIG. 5B, a track N–1 is shown relative to previously written bursts C and D. An erase pass step is shown to trim under the last written servo burst D and DC erase the full width of the field indicated by the block TRIM D.

Figure 5C:
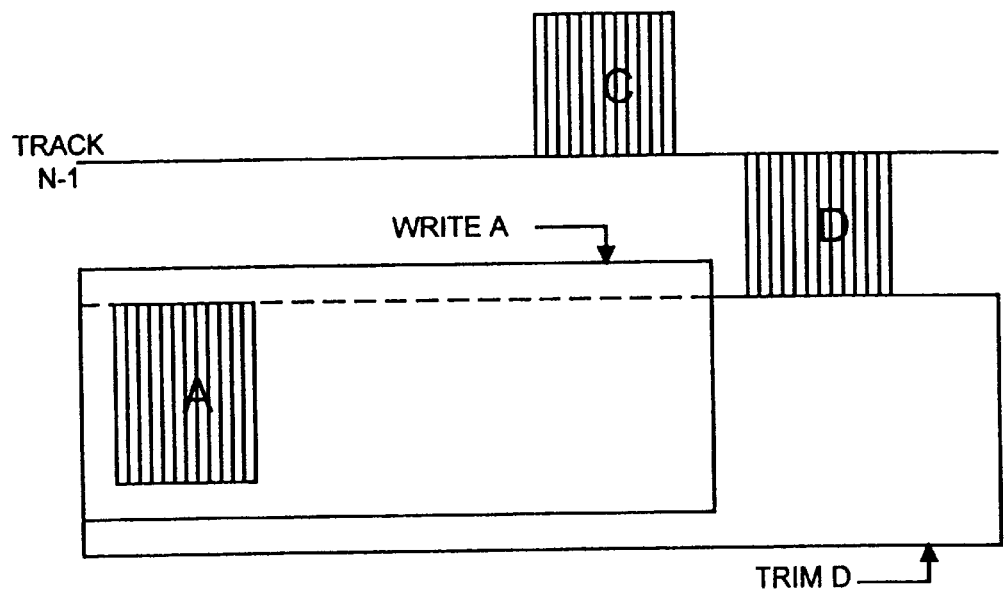

FIG. 5C illustrates a next writing step following the trimming of the servo burst D of FIG. 5B, for writing a next servo burst A indicated by WRITE A. In FIG. 5C, the transducer head assembly 28 has been moved in the second direction a distance equal to the erase band toward the last written burst D indicated by the offset of WRITE A relative to the block TRIM D.

Figure 5D:
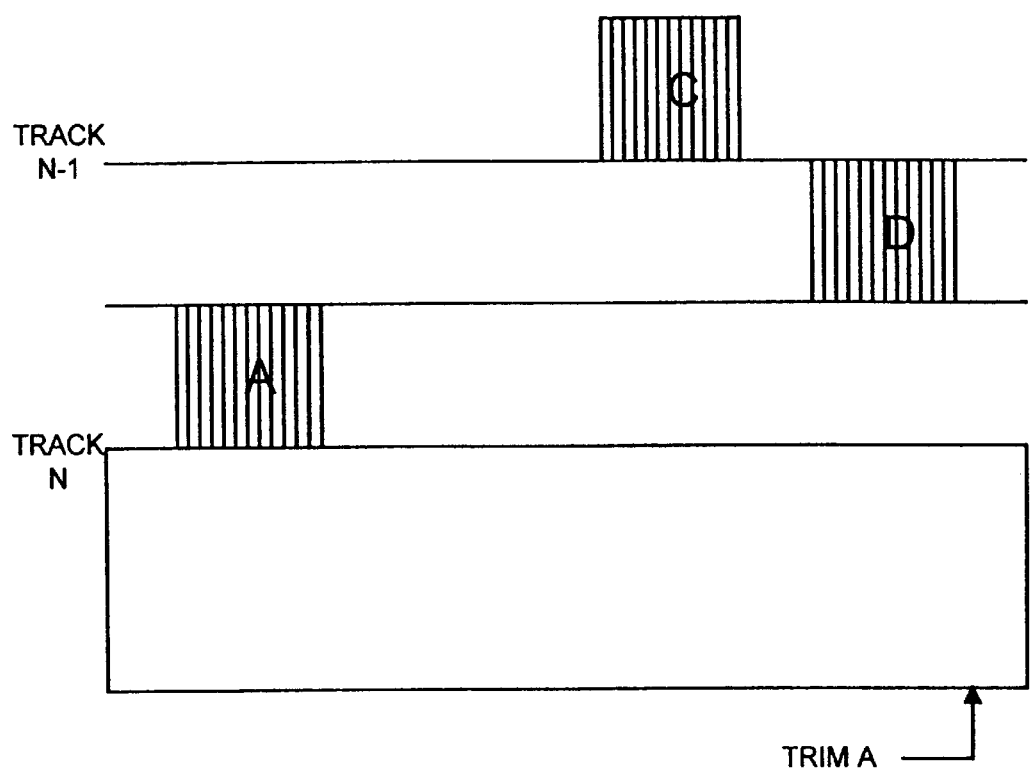

FIG. 5D illustrates a next trimming step following the writing of the servo burst A of FIG. 5C, an erase pass step is shown to trim under the last written servo burst A indicated by the block TRIM A. Note that the upper edge of the block TRIM A corresponds to the next TRACK N following TRACK N–1.

Figure 5E:
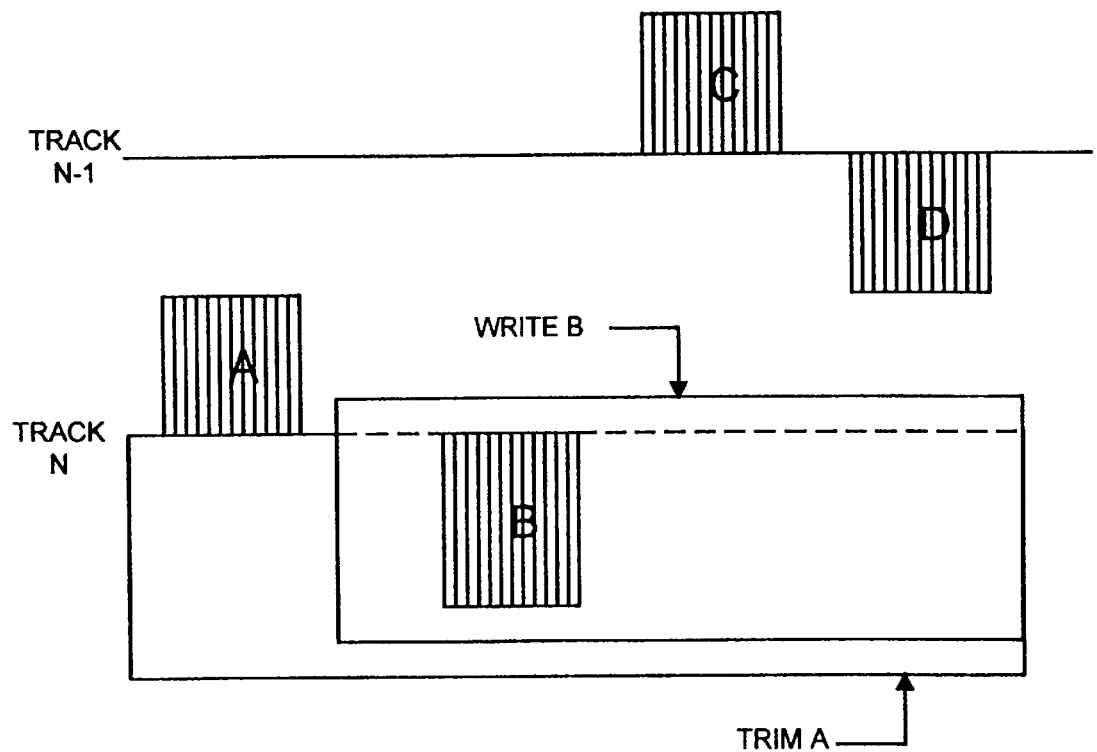

FIG. 5E illustrates TRACK N–1 and TRACK N. A next writing step is shown following the trimming of the servo burst A of FIG. 5D for writing a next servo burst B indicated by WRITE B. In FIG. 5E, the transducer head assembly 28 has been moved in the second direction a distance equal to the erase band toward the last written burst A indicated by the offset of WRITE B relative to the block TRIM A.

Figure 5F:
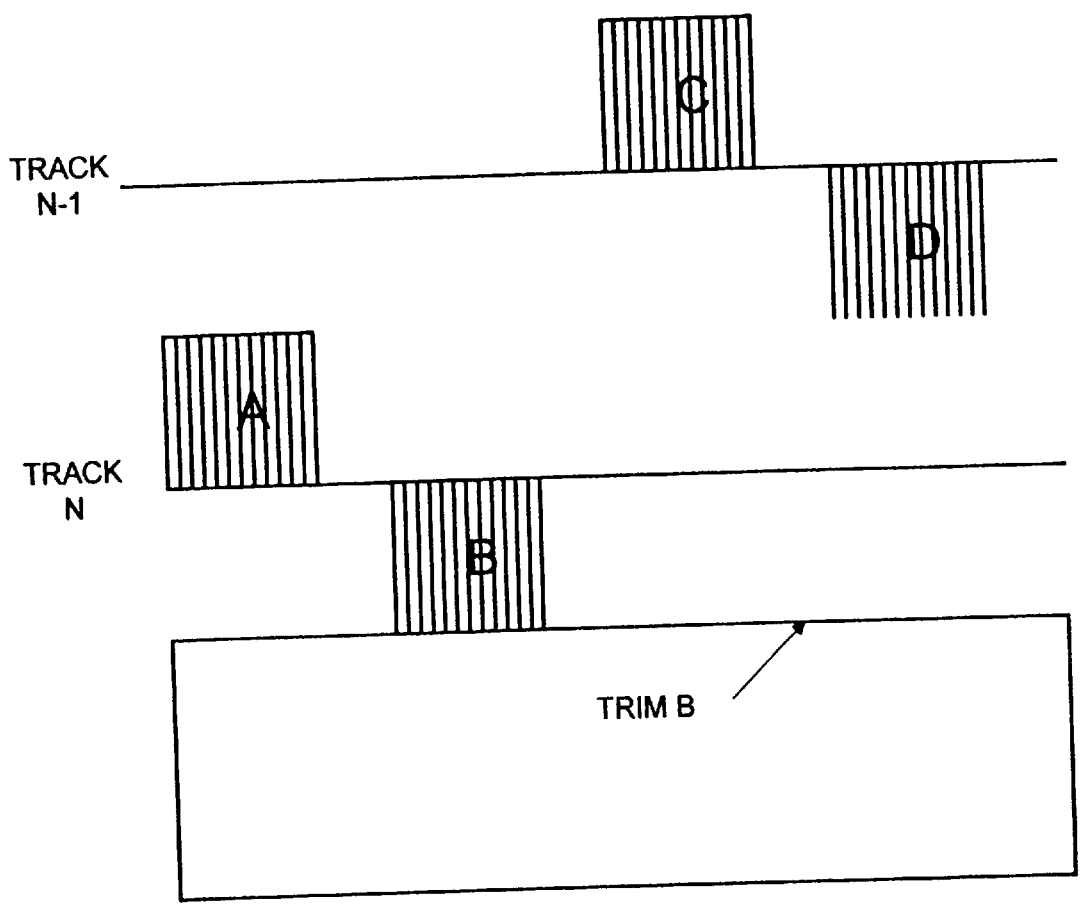

FIG. 5F illustrates a next trimming step following the writing of the servo burst B of FIG. 5E where an erase pass step is performed to trim under the last written servo burst B indicated by the block TRIM B.

Figure 5G:
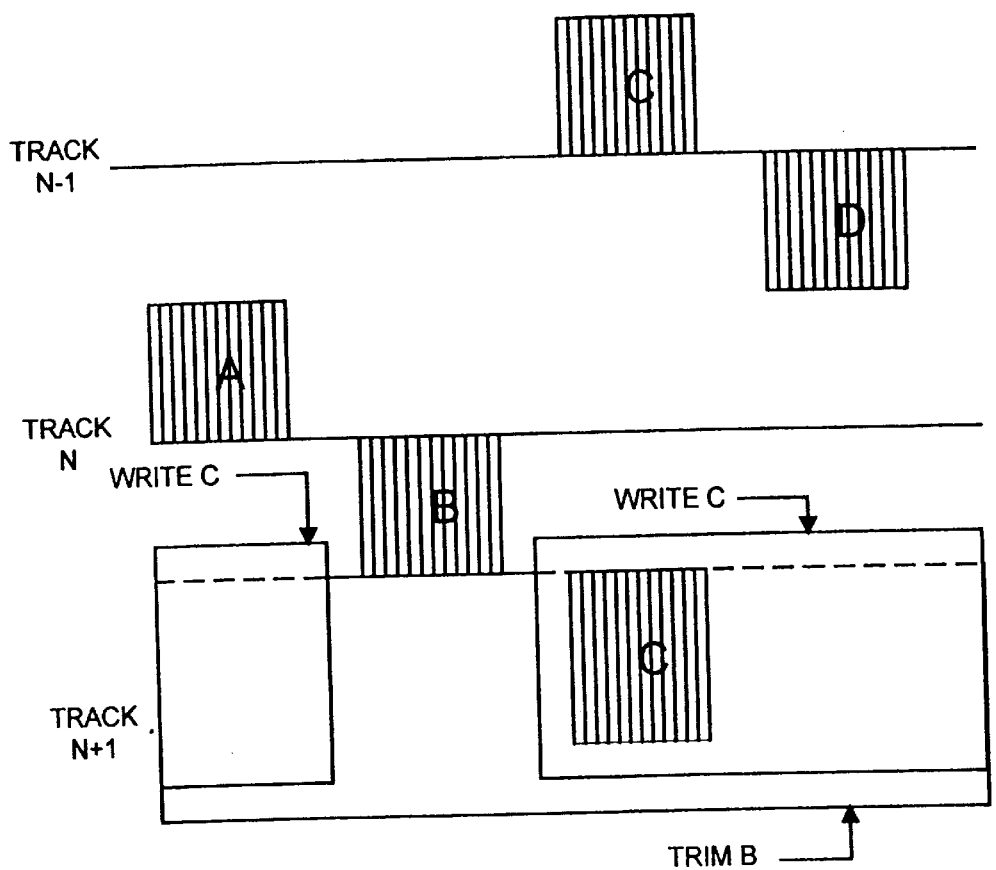
Figure 5H:
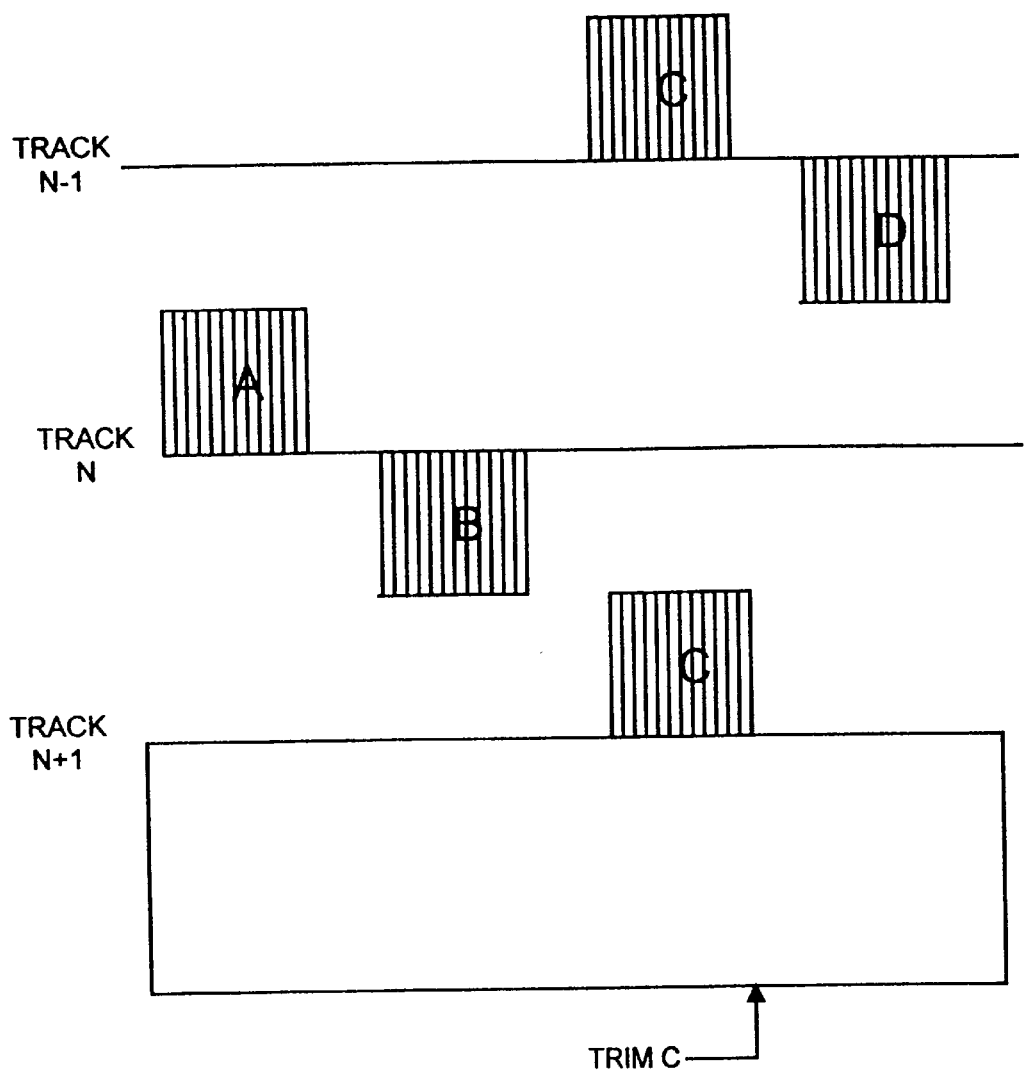

FIG. 5G illustrates a next writing step following the trimming of the servo burst B of FIG. 5H for writing a next servo burst C indicated by the blocks WRITE C. In FIG. 5G, the transducer head assembly 28 has been moved in the second direction a distance equal to the erase band toward the last written burst B indicated by the offset of the blocks WRITE C relative to the block TRIM B. Note that the WRITE C is turned off before and after the previously written servo burst B.

FIG. 5H illustrates TRACK N–1, TRACK N and TRACK N+1 with the previously written bursts C, D, A, B, and C. A next trimming step is shown following the writing of the servo burst C of FIG. 5G to trim burst C indicated by the block TRIM C. Note that the upper edge of the block TRIM C corresponds to the next TRACK N+1 following TRACK N.

In use, as a read head passes over the servo patterns, a signal is generated that is proportional to the amount of overlap of the read element over a given pattern. Each of the burst amplitudes A, B, C, D are then detected within gated windows. The magnitude within each of these timing windows is determined, which in an analog portion of channel 54 can be the integral of the full-wave rectified signal. Note that the read head may not pass over any of some specific pattern, so there may be zero amplitude for one or two of the measurements. Consider that the measured magnitudes are M1, M2, M3, and M4, corresponding to how much of the read head overlaps patterns A, B, C, or D, respectively.

Two of the detected magnitudes are electrically summed together such as M1+M2, which theoretically creates the same magnitude as one full wide track, corresponding to a width as wide as Burst A and Burst B combined. M3+M4 would simulate a full wide track signal corresponding to Burst C and Burst D combined. The sum M2+M3 corresponds to a full wide track of the combined width of Burst B and Burst C. Then M4+M1 corresponds to the signal from a track of combined width of Burst D and Burst A, where A is from the next cycle of the quad burst pattern. In this way, the four half track wide detected amplitudes can theoretically be manipulated to appear as the magnitudes generated from standard full track wide quad burst patterns. Separating the half track bursts in time eliminates the requirement of having phase alignment.

Figure 6:
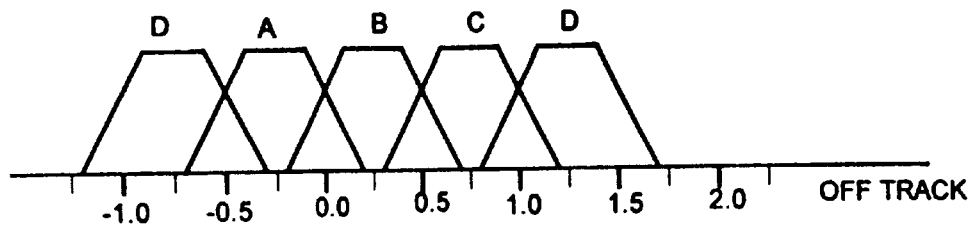
FIGS. 6, 7, 8 and 9 are charts illustrating signals resulting from the servo bursts with conventional trim of FIG. 4.
Figure 7:
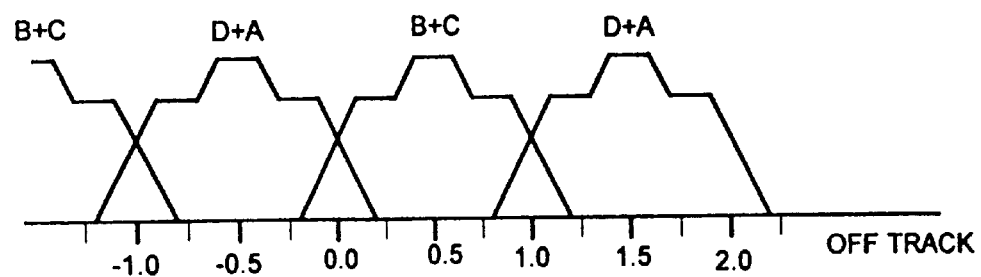
Figure 8:
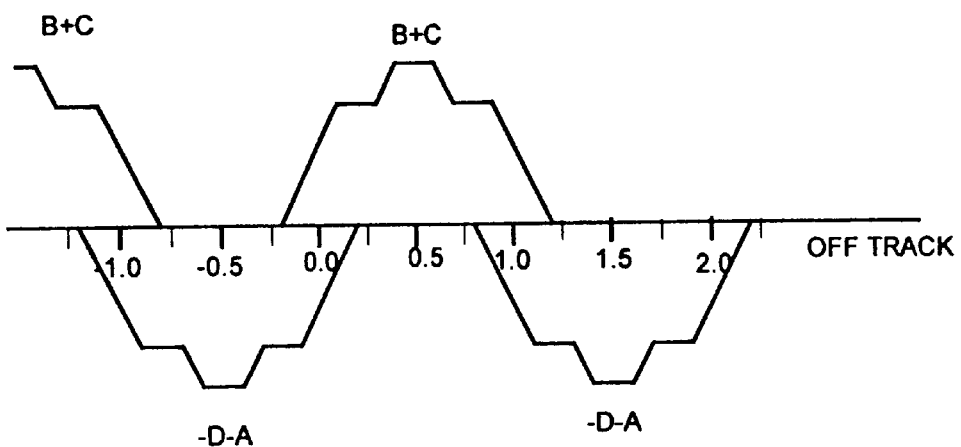

Referring now to FIGS. 6–9, there are shown charts illustrating signals resulting from the servo bursts with conventional trim of FIG. 4. Referring first to FIG. 6, there are shown burst amplitudes from FIG. 4 having standard trapezoidal shape displacement curves due to a uniform magnetization width, and a uniform read sensitive width, of different sizes. In FIG. 7, the illustrated sums of pairs of burst amplitude signals do not generate a desirable shape, due to the erase bands of FIG. 4. FIG. 8 shows the polarities of the sums as they are combined into a Position Error Signal (PES).

Figure 9:
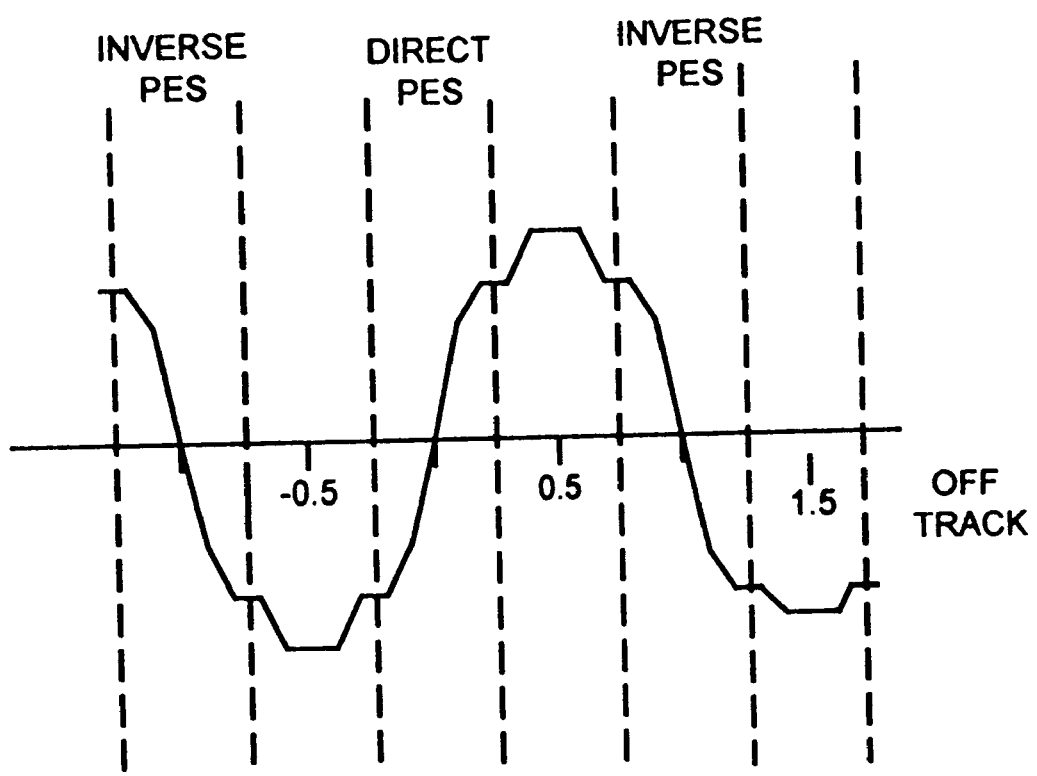

FIG. 9 shows the results of the final summing of the plus and minus terms to form the PES. Only a part of the waveform is used for the actual PES indication. The region indicated by DIRECT PES should be a linear region that is used for the correction around the zero offtrack position, plus and minus ¼ of a track. The regions indicated by INVERSE PES will be inverted to show the offtrack distance around the −1.0 track position (+/−¼), and the +1.0 track position. A second combination of A, B, C, D, in the form of +A+B−C−D is not shown, but will create the same shape of wave as FIG. 9, but offset left by ½ track and provides the offtrack indications in the other regions. In FIG. 9, note that the shape of the DIRECT PES region of the curve is far from linear. Between −0.1 and +0.1, the slope is twice what it is between −0.2 and −0.1, and +0.1 and +0.2. Then things get worse, with the curve being flat at both outer ends, for the last 0.05 of a track on each end. However, since the indication in the next region will also have a flat spot for 0.05 on each end, then there is a dead spot in the indication for 0.1 of a track every half track in distance.

Figure 10:
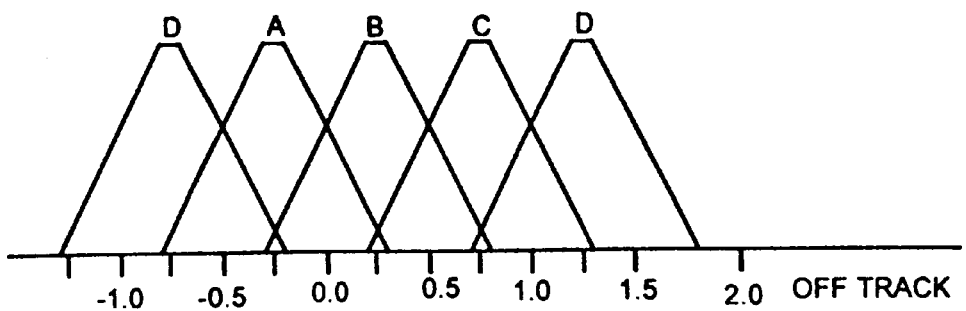
FIGS. 10, 11, 12, and 13 are charts illustrating signals resulting from the servo bursts with trim in accordance with the present invention of FIG. 5.
Figure 11:
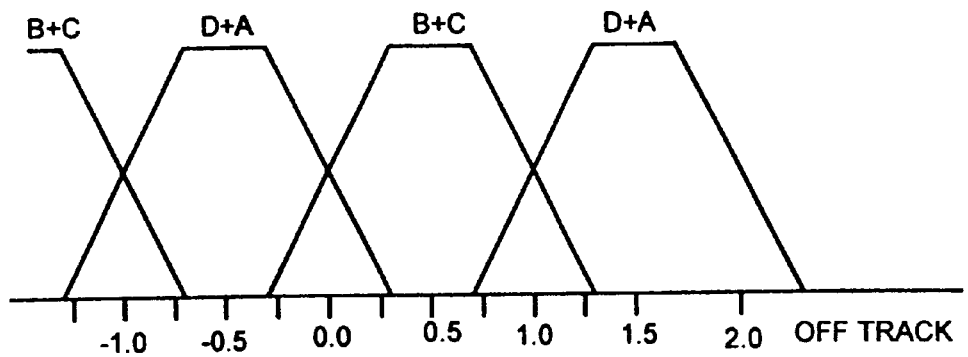
Figure 12:
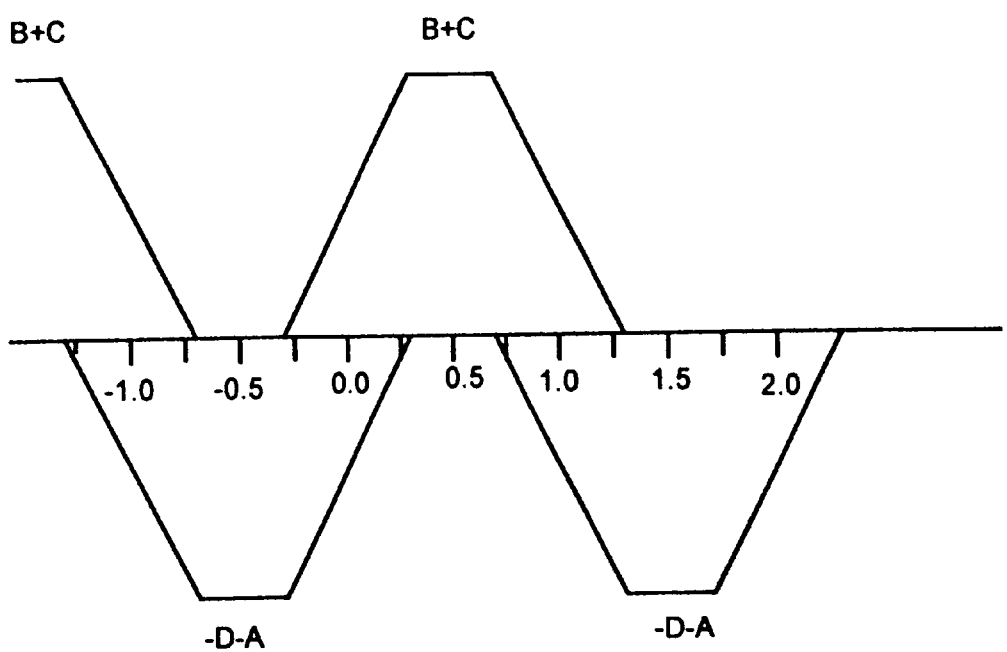
Figure 13:
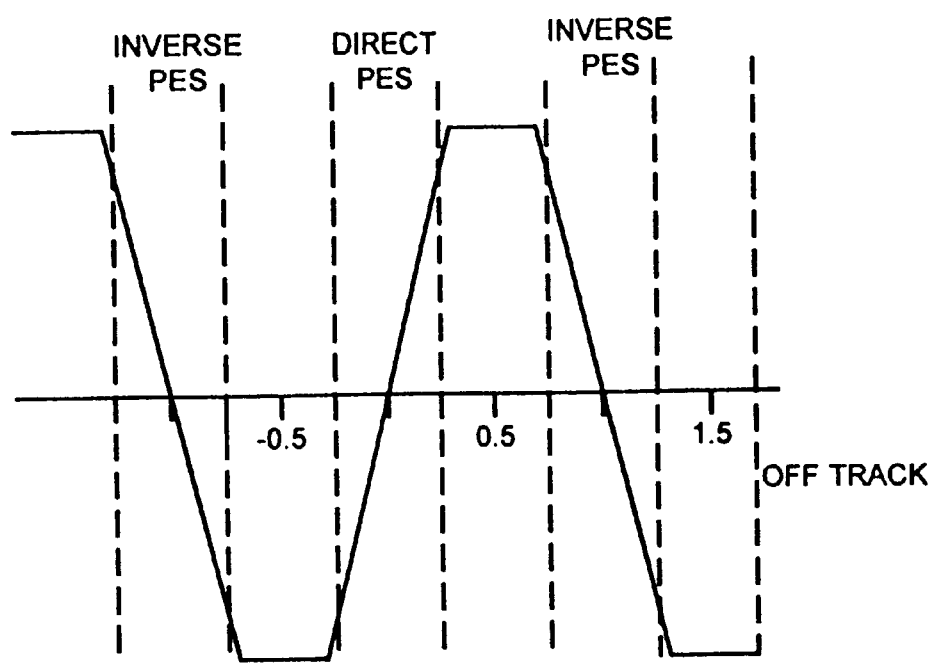

FIGS. 10, 11, 12, and 13 illustrate signals resulting from the servo bursts with trim in accordance with the present invention of FIG. 5. With the use of the present invention, the correct width of the servo bursts is obtained. FIG. 10 shows the trapezoidal displacement curves resulting form the servo pattern of FIG. 5. Notice that there is more width and amplitude of the burst amplitudes from FIG. 10 as compared to FIG. 6, since the widths of the recorded servo bursts of FIG. 5 are now wider. FIG. 11 shows the sum of the bursts as shown in FIG. 7, but now since the edges of the adjacent servo bursts align in FIG. 5, the sum theoretically merges into a straight line ramp with off track distance. FIG. 12 shows the D+A term inverted, in preparation for adding to get the PES curve. FIG. 13 shows the resulting PES curve. The linear regions of both the edges of the B+C curve and the −D−A curve have the breaks at the same offtrack position, so the resulting PES curve has the high slope through the whole region from −0.3 to +0.3 tracks. The switch to another branch occurs at +/−0.25 tracks and the curves are actually linear.

With magneto-resistive (MR) read heads provided in the transducer head assembly 28, the intrinsic variable sensitivity in the transducer read head shows through in the resulting PES curve. For MR heads 28, the PES curves do not have as much linear region, but the results are typically better when the magnetization widths recorded are written as illustrated and described in FIGS. 5 and 5A. For instance, the A+B+C+D values are a constant for any shape read sensitivity.

Comparing FIGS. 4 and 6–9 and FIGS. 5 and 10–13 clearly show that neglecting the effect of the erase band when using high density patterns similar to data density significantly degrades the resulting Position Error Signals (PES) developed from the recorded bursts of FIG. 4 as compared to the servo pattern of FIG. 5 written with erase band compensation. This is true for standard servo systems using phase alignment, as in known products, and for proposed systems where phase alignment may not be required. Thus there is a clear advantage in the linearity of PES and in the increased amplitude signal levels resulting from the servo writing method of the preferred embodiment.

Parts of the servo system have not been mentioned, such as Automatic Gain Control (AGC) field (in classical systems), Sector Identification (SID) fields, and Gray codes. These are normally phase aligned systems, which are not at optimum when the erase band is large. However, these fields can still be used at some lower density where they can be phase aligned with smaller erase bands as is presently done.

While the present invention has been described with reference to the details of the embodiments of the invention shown in the drawing, these details are not intended to limit the scope of the invention as claimed in the appended claims.

What is claimed is:

1. A method of writing servo bursts on a magnetic disk media of a direct access storage device (DASD) comprising the steps of:

writing a servo burst on the magnetic disk media using a transducer head in the DASD;

moving said transducer head in a first direction and trimming said written servo burst;

moving said transducer head in a second direction opposite said first direction and writing a next servo burst;

wherein the step of moving said transducer head in said first direction and trimming said written servo burst includes the step of moving said transducer head in said first direction a distance equal to the sum of the width of an erase band and the width of a desired servo burst; and wherein the step of moving said transducer head in a second direction opposite said first direction and writing a next servo burst includes the step of moving said transducer head in said second direction a distance equal to the width of an erase band.

2. A method of writing servo bursts as recited in claim 1 wherein the step of writing said servo burst on the magnetic disk media using said transducer head in the DASD includes the step of moving said transducer head to a starting servo writing position at an outside diameter (OD) of the magnetic disk media.

3. A method of writing servo bursts as recited in claim 2 includes the steps of sequentially repeating said steps moving said transducer head in a first direction and trimming said written servo burst and moving said transducer head in a second direction opposite said first direction and writing a next servo burst until an inside diameter (ID) of the magnetic disk media is reached.

4. A method of writing servo bursts as recited in claim 1 wherein the step of writing said servo burst on the magnetic disk media using said transducer head in the DASD includes the step of moving said transducer head to a starting servo writing position at an inside diameter (ID) of the magnetic disk media.

5. A method of writing servo bursts as recited in claim 4 includes the steps of sequentially repeating said steps moving said transducer head in a first direction and trimming said written servo burst and moving said transducer head in a second direction opposite said first direction and writing a next servo burst until an outside diameter (OD) of the magnetic disk media is reached.

6. A method of writing servo bursts as recited in claim 1 wherein the step of moving said transducer head in said first direction and trimming said written servo burst includes the steps of moving said transducer head in said first direction and performing an erase pass to trim said last written servo burst.

7. Apparatus for writing servo bursts on a magnetic disk media of a direct access storage device (DASD) comprising:

means for writing a servo burst on the magnetic disk media using a transducer head in the DASD;

means for moving said transducer head a first distance in a first direction and for trimming said written servo burst; said first distance corresponding to the sum of the width of an erase band and the width of a desired servo burst; and means for moving said transducer head in a second distance in a second direction opposite said first direction and for writing a next servo burst; said second distance corresponding to the width of said erase band.

8. A direct access storage device (DASD) comprising:

at least one disk mounted for rotation;

a transducer head mounted for movement across tracks recorded on the at least one disk;

means for writing servo bursts on a magnetic disk media of said at least one disk including;

means for writing a servo burst on said magnetic disk media using said transducer head;

means for moving said transducer head a first distance in a first direction and for trimming said written servo burst; said first distance corresponding to the sum of the width of an erase band and the width of a desired servo burst; and means for moving said transducer head in a second distance in a second direction opposite said first direction and for writing a next servo burst; said second distance corresponding to the width of said erase band.

* * * * *